US008526699B2

(12) United States Patent
Mittal et al.

(10) Patent No.: US 8,526,699 B2
(45) Date of Patent: Sep. 3, 2013

(54) METHOD AND SYSTEM FOR AUTOMATIC DETECTION AND CLASSIFICATION OF CORONARY STENOSES IN CARDIAC CT VOLUMES

(75) Inventors: Sushil Mittal, Highland Park, NJ (US); Yefeng Zheng, Dayton, NJ (US); Bogdan Georgescu, Plainsboro, NJ (US); Fernando Vega-Higuera, Erlangen (DE); Shaohua Kevin Zhou, Plainsboro, NJ (US); Dorin Comaniciu, Princeton Junction, NJ (US); Michael Kelm, Erlangen (DE); Alexey Tsymbal, Erlangen (DE); Dominik Bernhardt, Hausen (DE)

(73) Assignee: Siemens Aktiengesellschaft, Munich (DE)

( * ) Notice: Subject to any disclaimer, the term of this patent is extended or adjusted under 35 U.S.C. 154(b) by 199 days.

(21) Appl. No.: 13/040,716

(22) Filed: Mar. 4, 2011

(65) Prior Publication Data

US 2011/0224542 A1 Sep. 15, 2011

Related U.S. Application Data

(60) Provisional application No. 61/313,282, filed on Mar. 12, 2010, provisional application No. 61/384,462, filed on Sep. 20, 2010, provisional application No. 61/387,202, filed on Sep. 28, 2010.

(51) Int. Cl.
*G06K 9/00* (2006.01)
*A61B 5/05* (2006.01)
*A61B 5/02* (2006.01)
*A61F 2/06* (2013.01)

(52) U.S. Cl.
USPC ........... 382/131; 600/425; 600/485; 623/1.36

(58) Field of Classification Search
USPC .................. 382/128, 129, 130, 131, 132, 133, 382/134; 600/407, 410, 425, 381, 480, 482, 600/485, 500, 505, 324, 454, 468, 481; 623/1.21, 1.27, 1.36, 903, 916, 921, 1.14, 623/3.13, 3.14; 378/4, 8, 901
See application file for complete search history.

(56) References Cited

U.S. PATENT DOCUMENTS

| 6,047,080 | A  | * | 4/2000  | Chen et al. ............... 382/128 |
| 7,627,156 | B2 | * | 12/2009 | Margolis et al. .......... 382/128 |
| 2007/0274579 | A1 | * | 11/2007 | Cai et al. ................ 382/131 |
| 2010/0004526 | A1 |   | 1/2010  | Wei et al. |
| 2010/0076296 | A1 |   | 3/2010  | Mittal et al. |
| 2010/0274133 | A1 |   | 10/2010 | Palti |

OTHER PUBLICATIONS

Gülsün, M.A., et al., "Robust Vessell Tree Modeling", In MICCAI '08, Proceeding of the 11th International Conference on Medical Image Computing and Computer-Assisted Intervention, 2008.
Lesage, D., et al., A Review of 3d Vessel Lumen Segmentation Techniques: Models, Features and Extraction Schemes, Medical Image Analysis, 13(6):819-845, 2009.
Schaap, M., et al., "Coronary Lumen Segmentation Using Graph Cuts and Robust Kernel Regression", In K. J. M. Jerry L. Prince, Dzung L. Pham, editor, Information Processing in Medical Imaging 2009, pp. 528-539, 2009.
TeBmann, M., et al., "Learning-Based Deteciton of Stenotic Lesions in Coronary CT Data", In Proc. of Vision, Modeling and Visualization, pp. 189-198, Konstanz, Germany, 2008.

* cited by examiner

*Primary Examiner* — Abolfazl Tabatabai

(57) ABSTRACT

A method and system for providing detecting and classifying coronary stenoses in 3D CT image data is disclosed. Centerlines of coronary vessels are extracted from the CT image data. Non-vessel regions are detected and removed from the coronary vessel centerlines. The cross-section area of the lumen is estimated based on the coronary vessel centerlines using a trained regression function. Stenosis candidates are detected in the coronary vessels based on the estimated lumen cross-section area, and the significant stenosis candidates are automatically classified as calcified, non-calcified, or mixed.

28 Claims, 13 Drawing Sheets

METHOD AND SYSTEM FOR AUTOMATIC DETECTION AND CLASSIFICATION OF CORONARY STENOSES IN CARDIAC CT VOLUMES

This application claims the benefit of U.S. Provisional Application No. 61/313,282, filed Mar. 12, 2010, U.S. Provisional Application No. 61/384,462, filed Sep. 20, 2010, and U.S. Provisional Application No. 61/387,202, filed Sep. 28, 2010, the disclosures of which are herein incorporated by reference.

BACKGROUND OF THE INVENTION

The present invention relates to medical image based detection of coronary stenoses, and more particularly, to automatic detection and classification of coronary stenoses in cardiac computed tomography (CT) volumes.

According to the American Heart Association, coronary artery disease (CAD) is one of the leading causes of death in the western world. Every year, approximately six million patients in United States emergency departments are evaluated for acute chest pain. The current standard for diagnosis is the conventional invasive coronary angiography, which is expensive and involves a high amount of risk. New generations of high-performance CT scanners, and in particular the advent of dual-source CT scanners, have enabled the acquisition of high-quality Coronary CT Angiography (CCTA) images. A multitude of clinical studies have proven the utility of CCTA for detection of coronary lesions, and in particular for the evaluation of emergency room patients with acute chest pain using the so-called "triple rule-out" technique. Because of their high quality, CCTA images may be a viable alternative for invasive angiography in the near future. In particular, the high negative predicative value of CCTA images allows a physician to rule out aortic dissection, pulmonary embolism, and significant stenoses in the coronary vessels by a single CT examination. However, reading CCTA images requires substantial experience and only well-trained physician typically are able to interpret CCTA images appropriately.

The detection, classification, and rating of coronary stenoses in CCTA images is challenging due to varying image quality due to low signal-to-noise ratios and motion/reconstruction artifacts. Even experts may struggle to give a correct diagnosis using CCTA images. This may lead to incorrect or inconsistent evaluation of coronary stenoses. Accordingly, automatic detection of various types of stenoses in the coronary vessels is desirable.

BRIEF SUMMARY OF THE INVENTION

The present invention provides a method and system for automatic detection and classification of coronary stenoses in cardiac computed tomography (CT) volumes. Embodiments of the present invention can be used to detect stenoses in the coronary vessels and quantify a grade for the stenoses in order to rule out insignificant stenoses.

In one embodiment of the present invention, coronary vessel centerlines are extracted from a 3D CT volume. A lumen cross-section area is estimated based on the coronary vessel centerlines. Stenosis candidates are detected based on the estimated lumen cross-section area. Non-vessel regions may be detected in along the coronary vessel centerlines and removed from the coronary vessel centerlines prior to estimating the lumen cross-section area. The detected stenosis candidates may be classified. The classification of the detected stenosis candidates may include determining which of the detected stenosis candidates are significant, and classifying each significant stenosis candidate as one of calcified, non-calcified, and mixed.

These and other advantages of the invention will be apparent to those of ordinary skill in the art by reference to the following detailed description and the accompanying drawings.

DETAILED DESCRIPTION

The present invention relates to a method and system for automatic detection, grading, and classification of coronary stenoses in cardiac computed tomography (CT) volumes. Embodiments of the present invention are described herein to give a visual understanding of the coronary stenoses detection and grading method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Figure 1:
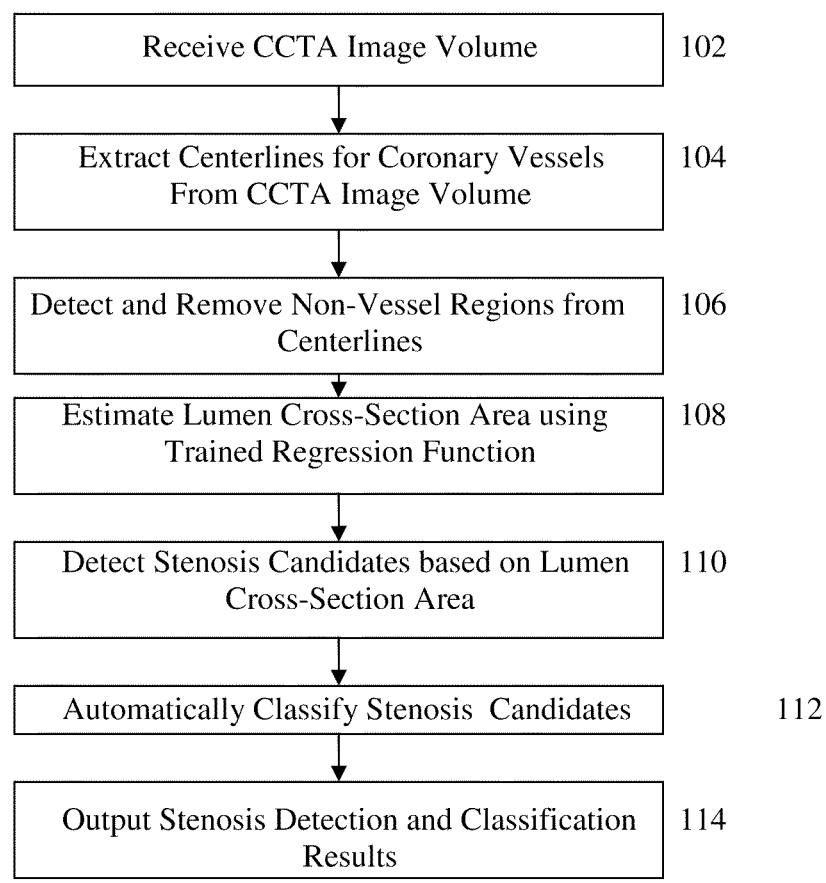
FIG. 1 illustrates a method for automatic detection and classification of coronary stenoses in a coronary CT angiography (CCTA) image volume according to an embodiment of the present invention.

FIG. 1 illustrates a method for automatic detection and classification of coronary stenoses in a coronary CT angiography (CCTA) image volume according to an embodiment of the present invention. As illustrated in FIG. 1, at step 102, a CCTA image volume is received. The CCTA image volume is a 3D cardiac CT volume that is acquired after a contrast agent is injected into a patient, thus showing contrast-enhanced coronary arteries. The CCTA image volume can be received from a CT scanner. The CCTA volume may also be received by loading a previously stored CCTA volume.

At step 104, centerlines for the coronary vessels are extracted from the CCTA image. Manual tracing of coronary artery centerlines in 3D cardiac CT data is a highly tedious task. This can be attributed to the fact that the coronary arteries follow a long path, which is difficult to accurately trace. Moreover, with current standards of CT image acquisition, the coronary artery may only be a few voxels in diameter. The task of tracing coronary artery centerlines becomes even more difficult at the distal parts of the coronaries due to narrowing of the vessels, branching, and loss of brightness in those regions. Accordingly, many algorithms for automatic or semiautomatic tracing of centerlines have been proposed. Automatic methods for coronary artery tracking (CAT) typically use the coronary ostia as a seed point to start the centerline tracing. Any method for tracking the centerlines of the coronary vessels can be used to implement step 104. For example, various methods for extracting centerlines for coronary vessels are described in D. Lesage, et al., "A Review of 3D Vessel Lumen Segmentation Techniques Models, Features and Extractions Schemes", *Medical Image Analysis*, 13(6):819-845, 2009, which is incorporated herein by reference. According to an advantageous implementation, the centerlines of the coronary vessels can be extracted in step 104 using the method described in M. A. Gulsun, et al., "Robust Vessel Tree Modeling", In *MICCAI '08: Proceedings of the 11th International Conference on Medical Image Computing and Computer-Assisted Intervention*, 2008, which is incorporated herein by reference.

Figure 2:
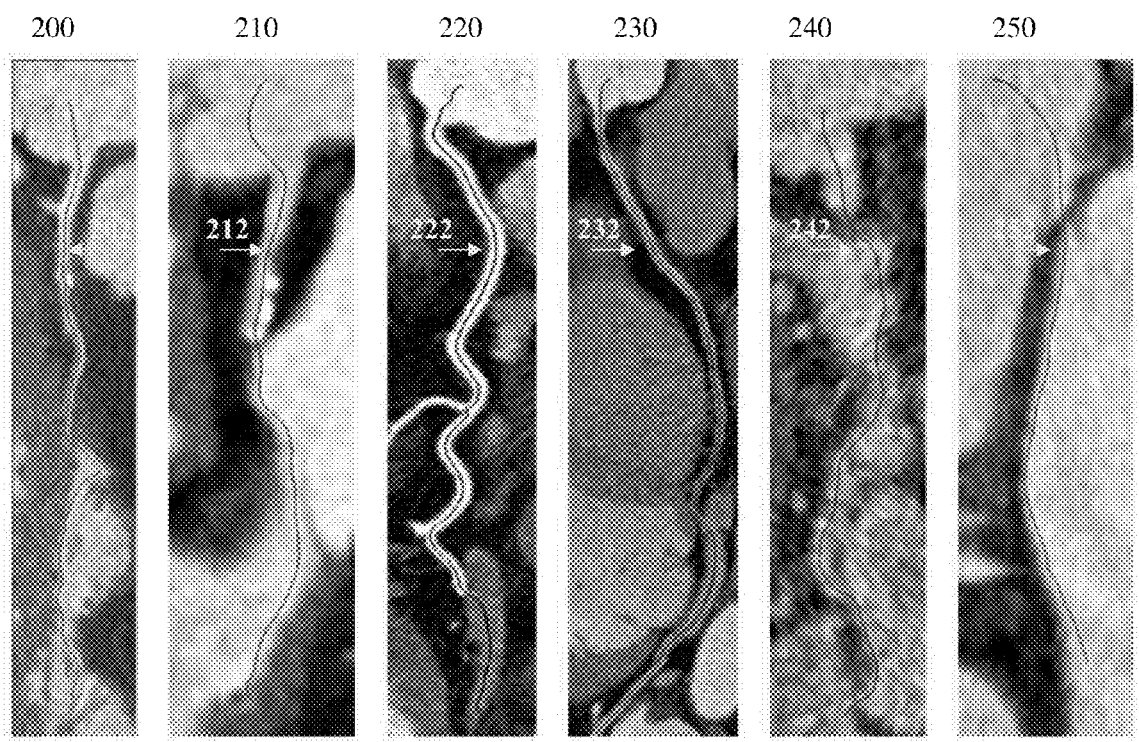
FIG. 2 illustrates exemplary coronary centerline tracing results.

At step 106, non-vessel regions along the centerlines are detected and removed. In a possible implementation, a trained non-coronary vessel region detector is used to detect the non-vessel regions along the extracted centerlines. The non-coronary vessel region detector may be a random forest classifier trained using rotation invariant features extracted in a cylindrical sampling pattern based on annotated training samples. The non-coronary vessel region detector can determine whether points on the extracted centerlines are in a non-vessel region based on rotation invariant features extracted in a cylindrical sampling pattern around each point Any centerline tracing algorithm used to extract the coronary vessel centerlines in step 104 may be subject to errors in tracing, thus resulting in centerlines entering non-coronary artery regions, such as veins, heart chambers, etc. In some cases, the centerline of one coronary artery may be traced into another coronary artery or a coronary vein. Accordingly, some centerlines extracted in step 104 may be partially or completely incorrect. FIG. 2 illustrates exemplary curved multiplanar reconstruction (CPR) views of coronary centerline tracing results resulting from step 104. The coronary centerlines shown in FIG. 2 were extracted using the method described in M. A. Gulsun, et al., "Robust Vessel Tree Modeling", In *MICCAI '08: Proceedings of the 11th International Conference on Medical Image Computing and Computer-Assisted Intervention*, 2008. In images 200 and 210 of FIG. 2, the centerlines 202 and 212 are partially incorrect and are traced into a heart chamber and the aorta, respectively. In images 220 and 230, the centerlines 222 and 232 are partially incorrect and are traced into a vein. In images 240 and 260, the centerlines 242 and 262 are trace completely wrong into a heart chamber. Table 1 summarizes errors in tracing coronary vessel centerlines for a total of 229 volumes with 1472 traced centerlines using the algorithm described in M. A. Gulsun, et al., "Robust Vessel Tree Modeling", In *MICCAI '08: Proceedings of the 11th International Conference on Medical Image Computing and Computer-Assisted Intervention*, 2008.

TABLE 1

| Error in tracing | ≧5 mm | ≧10 mm | ≧15 mm |
|---|---|---|---|
| # vessels affected | 259 | 226 | 210 |
| # volumes affected | 131 | 116 | 107 |

It can be noted that Table 1 does not include parts of centerlines extended into the aorta. The algorithm used to extract the centerlines knows the exact position of the ostia, and the tracing of a part of the centerline into the aorta is intentional in this algorithm.

Based on the results illustrated in FIG. 2 and Table 1, it can be understood that the use of such centerlines to manually or automatically detect coronary lesions may lead to inaccurate detection results. In particular, the detection of coronary lesions being very sensitive to noise and other artifacts, it is very difficult to extract meaningful features to differentiate between normal and lesion regions along such centerlines. Therefore, according to an embodiment of the present invention, a fast and automatic technique is used for correction of the extracted centerlines. In particular, a learning based method is used for detection of non-coronary regions along the extracted centerlines. In one embodiment, a cylindrical sampling pattern can be used for feature extraction, with the axis of the cylinder aligned to the coronary centerline. Rotation invariant features can be extracted along the length of the cylinder at varying radii. These features can be used to train a random forest (RF) based classifier to detect the non-coronary regions.

In an exemplary implementation, the present inventors worked with scans obtained from 229 patients. The slice thickness for these scans varied between 0.3-0.5 mm, with x-y pixel spacing typically being between 0.3-0.4 mm. Each scan typically includes approximately 200-300 slices. The centerline tracing method described in M. A. Gulsun, et al., "Robust Vessel Tree Modeling", In *MICCAI '08: Proceedings of the 11th International Conference on Medical Image Computing and Computer-Assisted Intervention*, 2008 can be used to extract the centerlines. This method outputs centerlines for three main coronary arteries along with their branches—left anterior descending artery (LAD), left circumflex artery (LCX), and right coronary artery (RCA). The left main coronary artery (LM) is traced as part of the LAD and/or LCX artery. This method outputs the set of individual coronary centerlines, each starting from the aorta. Therefore, there is significant overlap between two branches originating from the same main artery. To avoid redundancy, the output centerlines can be converted into a coronary centerline tree by merging together the common regions in the extracted vessels.

Figure 3:
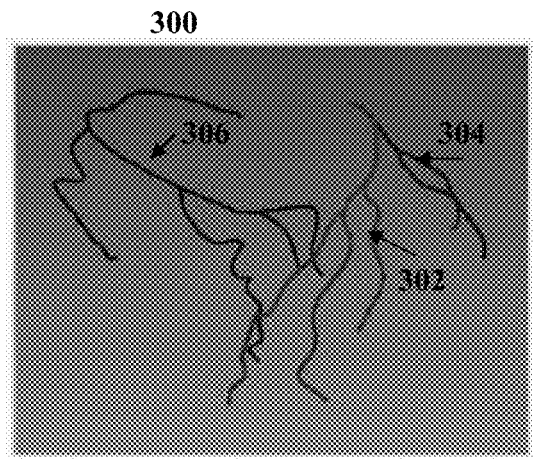
FIG. 3 illustrates an exemplary coronary centerline tree obtained from individually extracted centerlines.

FIG. 3 illustrates an exemplary coronary centerline tree 300 obtained from individually extracted centerlines. As shown in FIG. 3, the centerline tree 300 includes the LAD, LCX, and RCA coronary arteries their branches 302, 304, and 306, respectively. Due to varying lengths of the coronary arteries, the points along the centerlines can be re-sampled to have the same resolution (e.g., 1 mm) and smoothed, for example using a binomial filter. In order to generate training samples, two copies of the resulting centerline trees can be created. In the first copy, all points in the non-coronary regions can be manually removed. Positive training samples (points in the non-coronary regions) can then be obtained by subtracting the set of points in the first copy from those in the second copy. Negative training samples (points inside the coronary arteries) are simply the points in the first copy. In an exemplary implementation, there were a total of 21,940 positive training samples (including points inside the aorta) and 104,191 negative training samples that were obtained. Feature extraction is performed in a neighborhood of each positive and negative training sample to extract rotation invariant features corresponding to each training sample.

A supervised learning algorithm requires features that are sufficiently able to capture the characteristic properties of the underlying classes of data. Coronary arteries are locally cylindrical in shape their thickness usually decreasing from their starting points (e.g., the ostia) to their distal ends. The non-coronary regions, on the other hand, have no specific shape, size, or location along the centerline. The selected sampling pattern should therefore be invariant to such changes. According to an advantageous embodiment of the present invention, a cylindrical sampling pattern with its axis aligned to the centerline of a coronary vessel is used. The length of the cylinder must be carefully chosen. The length cylinder should be small enough to exploit the locally cylindrical shape of the coronary artery. At the same time, the length of cylinder should be large enough so that there is sufficient overlap between the sampling patterns of any two adjacent control points along the centerline so that no region is missed by the feature extraction pattern.

Figure 4A:
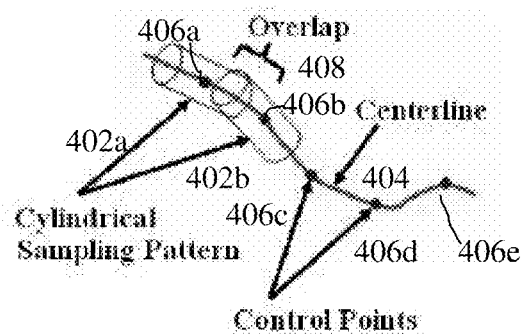
FIGS. 4A and 4B illustrate a cylindrical sampling pattern for feature extraction.
Figure 4B:
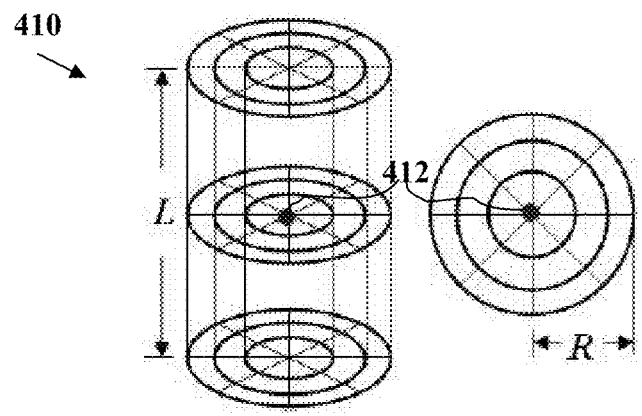

FIGS. 4A and 4B illustrate a cylindrical sampling pattern for feature extraction. As illustrated in FIG. 4A, the axis of each cylindrical sampling pattern 402a and 402b is aligned to the centerline 404. The cylindrical sampling patterns 402a and 402b are centered on a respective on of the control points 406a-406e on the centerline 404. The cylindrical sampling patterns 402a and 402b have a length large enough so that there is an overlap 408 between the cylindrical sampling patterns 402a and 402b at two adjacent control points 406a and 406b. Embodiments of the present invention utilize features that are rotation invariant about the axis of the cylinder. As shown in image 4B, a cylindrical sampling pattern 410 of length L and radius R is defined around a control point 412. For a point at distance l, $-L/2 \leq l \leq L/2$, from the control point 412 along the axis of the cylinder 410, the following nine features can be extracted at a radius r, where $0 \leq r \leq R$: average, minimum, and maximum intensities ($I_{av}$, $I_{min}$, $I_{max}$), average, minimum, and maximum gradients along the radial direction ($G_{av}^r$, $G_{min}^r$, $G_{max}^r$), and average, minimum, and maximum gradients along the tangent direction ($G_{av}^t$, $G_{min}^t$, $G_{max}^t$). According to an advantageous implementation, a length of L=6 (times 0.5 mm) can be used to give an acceptable overlap between adjacent cylinders, and a radius of R=3 (times 0.5 mm) can be used to sufficiently capture the width of the coronary. With L=6 and R=3, a 6×3×9=162 dimensional feature vector is obtained for each control point.

According to an advantageous implementation, random forests based supervised learning can be used to automatically train a classifier to detect the non-coronary regions along a given centerline. The random forests based learning can use the rotation invariant features described above to train a classifier to detect non-coronary vessel regions. A random forest based classifier is an ensemble of many decision trees that outputs the class that is the mode of the classes output by the individual trees. Alternatively, the outputs of the individual decision trees can also be combined into a probability mass function over various classes. This method outputs a probability that a point along a given centerline falls in the non-coronary vessel region. The threshold over this probability can be varied to obtain receiving operating characteristics (ROC) curves and a suitable operating point can then be selected on the curve.

Figure 5:
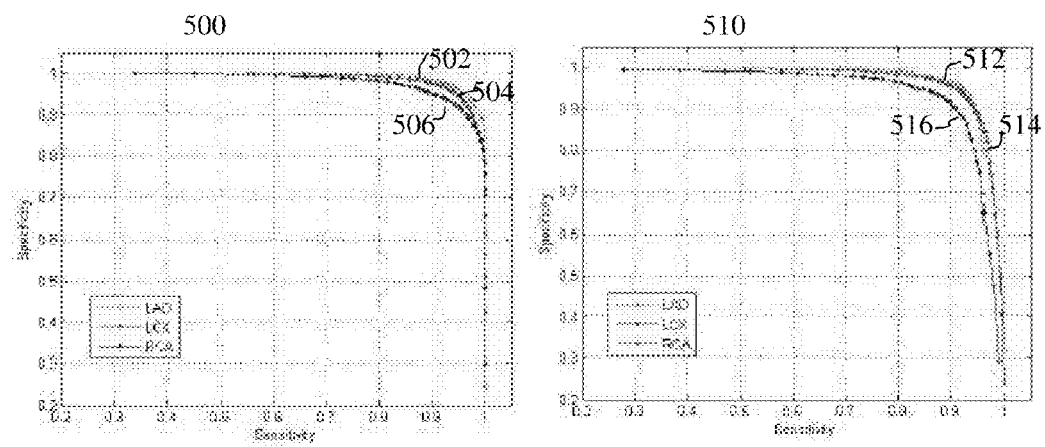
FIGS. 5 and 6 illustrate ROC curves for a trained non-coronary vessel region detector.

In order to select a suitable threshold for the probability output by the trained non-coronary vessel region classifier, the present inventors divided the entire data set into ten subsets, which were then used for a 10-fold cross validation. Training was performed using random forests using the rotation invariant features around each control point along the centerline. FIG. 5 illustrates ROC curves (sensitivity vs. specificity) obtained for training and cross validation by varying the threshold on probabilities returned by the trained classifier. In particular, FIG. 5 shows sensitivity vs. specificity ROC curves obtained using the random forests trained classifier over 229 volumes on per vessel point basis. Graph 500 shows ROC curves 502, 504, 506 for detection of the LAD, LAC, and RCA coronary arteries, respectively, performed over training data. Graph 510 shows ROC curves 512, 514, and 516 for detection of the LAD, LCX, and RCA coronary arteries, respectively, performed using 10-fold cross validation. The sensitivity and specificity in this case are computed on per control point basis and are defined as:

$$\text{Sensitivity} = \frac{\text{\# true positives}}{\text{\# true positives} + \text{\# false negatives}} \quad (1)$$

$$\text{Specificity} = \frac{\text{\# true negatives}}{\text{\# true negatives} + \text{\# false positives}}. \quad (2)$$

Figure 6:
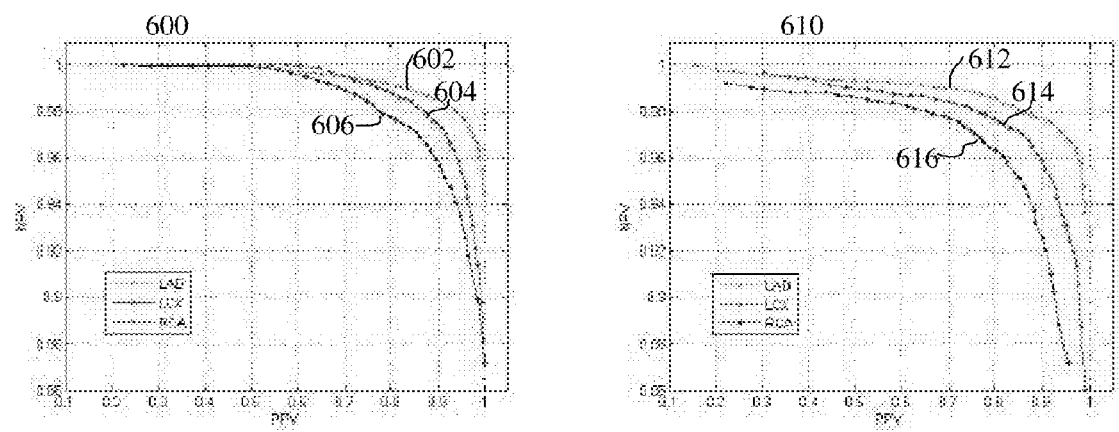

FIG. 6 illustrates ROC curves for Positive Predictive Value (PPV) vs. Negative Predicative Value (MPV) for training and cross validation experiments. In particular, FIG. 6 shows PPV vs. NPV ROC curves obtained using the random forests trained classifier over 229 volumes on per vessel point basis. Graph 600 shows ROC curves 602, 604, and 606 for detection of the LAD, LCX, and RCA coronary arteries, respectively, performed over training data. Graph 6102 shows ROC curves 612, 614, and 616 for the results of detection of the LAD, LCX, and RCA coronary arteries, respectively, performed using 10-fold cross validation. The PPV and NPV are computed on a per control point basis and are defined as:

$$PPV = \frac{\text{\# true positives}}{\text{\# true positives} + \text{\# false negatives}}. \quad (3)$$

$$NPV = \frac{\text{\# true negatives}}{\text{\# true negatives} + \text{\# false positives}}. \quad (4)$$

The average detection time per volume in this implementation was under one second. As observed from the ROC curves, the performance of the non-coronary vessel region detector is slightly worse for the RCA artery as compared to the LAD and LCX arteries. The reason for this can be attributed to the fact that in many cases, the middle and distal parts of the RCA artery may be confused with the coronary sinus and posterior vein of the left ventricle (which runs between the left and right ventricles parallel to the RCA). Since these veins have artery-like properties due to their cylindrical shape, it becomes harder to distinguish them from the arteries.

Figure 7:
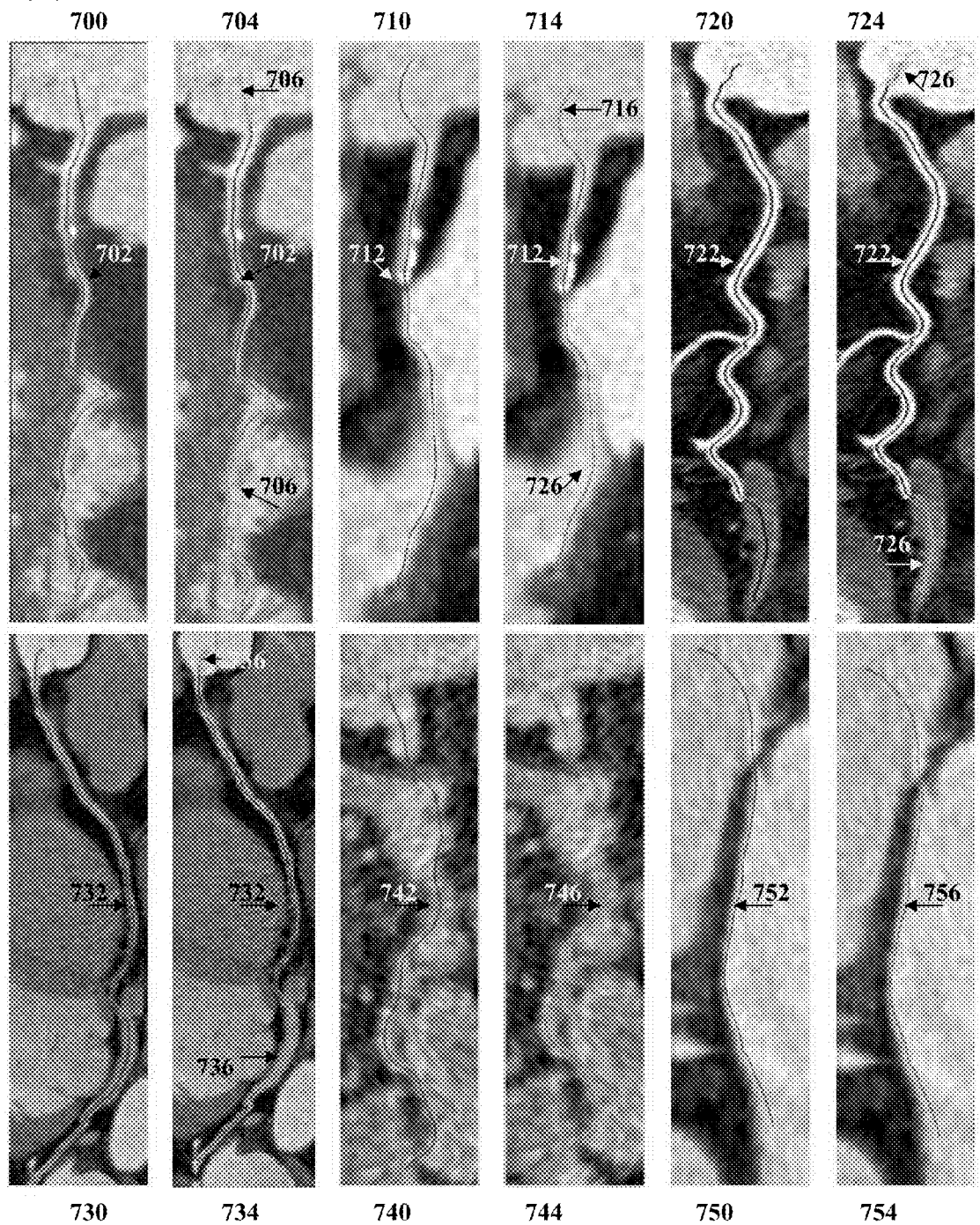
FIG. 7 illustrates exemplary results of the non-vessel region detection of step 106 of FIG. 1.

FIG. 7 illustrates exemplary results of the non-vessel region detection of step 106 of FIG. 1. In particular, FIG. 7 shows CPR views of centerline detection results 700, 710, 720, 730, 740, and 750 resulting from step 104 of FIG. 1 and corresponding non-vessel region detection results 704, 714, 724, 734, 744, and 754 resulting from step 106. Points detected outside the coronary vessels are marked with a "+" sign in images 704, 714, 724, 734, 744, and 754. Image 700 shows a detected centerline 702, and image 704 shows detected non-vessel regions 706 of the centerline 702. Image 710 shows a detected centerline 712, and image 714 shows detected non-vessel regions 716 of the centerline 712. Image 720 shows a detected centerline 722, and image 724 shows detected non-vessel regions 726 of the centerline 722. Image 730 shows a detected centerline 732, and image 734 shows detected non-vessel regions 736 of the centerline 732. Image 740 shows a detected centerline 742, and image 744 shows detected non-vessel regions 746 of the centerline 742. As shown in image 744, the entire centerline 742 of image 740 is detected as a non-vessel region 746. Image 750 shows a detected centerline 752, and image 754 shows detected non-vessel regions 756 of the centerline 752. As shown in image 754, the entire centerline 752 of image 750 is detected as a non-vessel region 746.

Returning to FIG. 1, at step 108, the lumen cross-section area is estimated using a trained regression function. According to an advantageous embodiment of the present invention, instead of segmenting the lumen and computing the lumen cross-section area along the vessel centerlines, a machine-learning approach, in particular a trained regression function, can be used to directly estimate the cross-section area from local image features. In order to estimate the cross-section area of the lumen, the radius R of a circle equivalent to the cross-section of the lumen is estimated, which is related to the cross-section area A of the lumen by $A = \pi R^2$.

Accordingly, a function for the radius $R = y(x|p)$ is estimated that depends on a set of extracted image features x and a set of parameters p that are learned from a manually annotated training data set. A training set $T = (x_1, y_1), (x_2, y_2), \ldots, (x_i, y_i), (x_N, y_N)$ is constructed by manually segmenting the lumen of coronary vessels in some CCTA data sets and computing the cross-section areas and from those the radii $y_i$ at altogether N points along the centerlines. For the same points along the centerlines, a set of features $x_i$ are extracted from the CCTA image volume around the corresponding point and aligned with the centerline. According to an advantageous implementation, the rotation-invariant features and cylindrical sampling pattern described above and illustrated in FIG. 4 can be used to train the regressive function. However, the present invention is not limited to these types of features, and other suitable features may be used as well.

Given the training set T, a regressor (regressive function) is trained by minimizing the squared loss function:

$$L(p) = \sum_{i=1}^{N} (y(x_i | p) - y_i)^2 \qquad (5)$$

with respect to the regression function parameters p. Different algorithms exist for minimizing the squared loss function. For example, the well known Boosting algorithm for Regression and the Random Forest Regression algorithm can be used. In an advantageous implementation, the Random Forest Regression algorithm is used to minimize the squared loss function in order to train the regression function.

Given a new, unseen volume, the trained regression function (using the minimizing parameters p determined above) can be used to estimate the lumen radius/area at arbitrary centerline points. In a possible implementation, the trained regression function can be used to estimate the radius (or area) at each control point (e.g., voxel) along the centerlines detected in steps 104 and 106.

Figure 8:
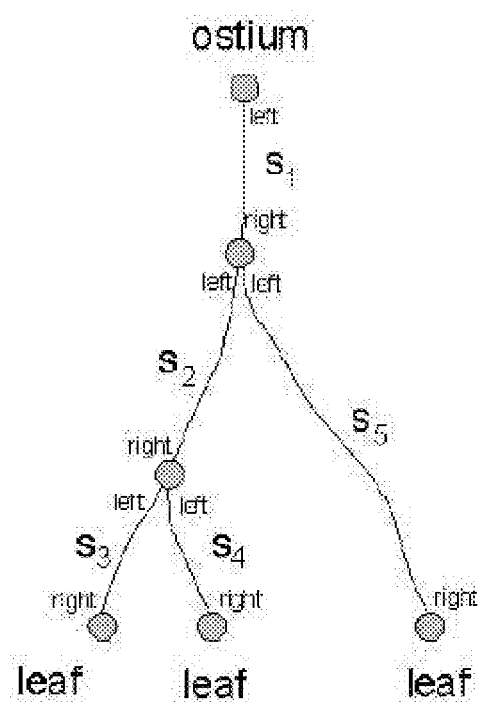
FIG. 8 illustrates an exemplary vessel tree that is divided into five disjoint segments.

At step 110, stenosis candidates are detected based on the estimated cross-section area of the lumen. In order to detect stenosis candidates in the coronary arteries, the extracted centerline tree can be divided into multiple segments, which are then examined separately for stenosis candidates. FIG. 8 illustrates an exemplary vessel tree that is divided into five disjoint segments $S_1$, $S_2$, $S_3$, $S_4$, and $S_5$. In FIG. 8, the beginning of each segment is referred to as the "left" end and the end of each segment is referred to as the "right" end. Every segment either starts at a vessel bifurcation ($S_2$-$S_5$) or an ostium ($S_1$) and ends at a bifurcation ($S_1$, $S_2$) or a vessel tree leaf ($S_3$-$S_5$).

Figure 9:
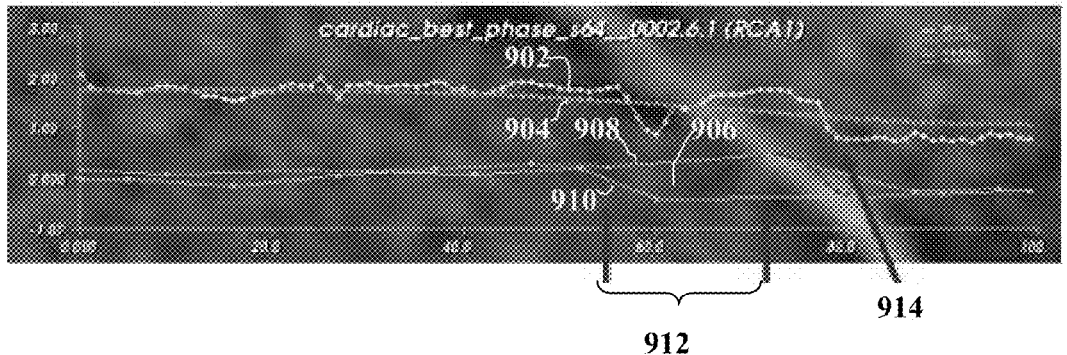
FIG. 9 illustrates stenosis candidate detection for an exemplary centerline segment.

For each disjoint segment of the vessel tree, the lumen radius/area curve along the vessel centerline is examined for stenoses. FIG. 9 illustrates stenosis candidate detection for an exemplary centerline segment. As illustrated in FIG. 9, radius curve 902 shows the radius estimate at various points along the centerline segment. The radius curve 902 results from the radius/area estimation of step 108 of FIG. 1. It is to be understood that an area curve can be used similarly to the radius curve 902 of FIG. 9. Using a low-pass filter (or spline smoother), a "baseline" curve 904 is calculated. The baseline curve 904 is subtracted from the radius curve 902 to obtain a de-trended residual curve which is again slightly smoothed, resulting in curve 906 in FIG. 9. From this curve 906, the positions of all local optima are extracted. As shown in FIG. 9, this results in a local maxima curve 908 and a local minima curve 910. Clearly, local minima and maxima alternate. Every triple (max-min-max) is then regarded as a stenosis candidate. In an extension to this approach, also the quintuples (max-min-max-min-max) and in general the 2n+1-tuples may be considered as stenosis candidates. As shown in FIG. 9, a stenosis candidate 912 is detected over a portion of the centerline at which a max-min-max pattern is observed. A bifurcation 914 is also shown in FIG. 9, after which the radius/area decreases.

Although FIG. 9 illustrates one technique for detecting stenosis candidates in a segment of a coronary vessel, it is to be understood that the present invention is not limited to the technique described above, and other techniques, such as multiscale classifiers and conditional random fields, may also be used to detect locations of stenosis candidates in a segment of coronary artery.

A stenosis grade is estimated for each detected stenosis candidate. The stenosis grade can be calculated by:

$$g = 1 - \left(\frac{2r_{min}}{r_{left} + r_{right}}\right)^2, \qquad (5)$$

where $r_{min}$ is the minimum radius estimate within the stenosis candidate, $r_{left}$ is the radius estimate at the left end (towards the ostium) and $r_{right}$ is the radius estimate at the right end (towards the leaves) of the stenosis candidate. For a stenosis candidate located at the left end of a particular vessel tree segment (at the ostia or a bifurcation), the grade can be estimated with the alternative formula:

$$g = 1 - \left(\frac{r_{min}}{r_{right}}\right)^2. \qquad (6)$$

Returning to FIG. 1, at step 112, the stenosis candidates are automatically classified. In particular, it is determined for each stenosis candidate whether that candidate should be discarded or whether it is a calcified, non-calcified, or mixed stenosis. The rotation invariant features and cylindrical sampling pattern described above and illustrated in FIG. 4 can be used for learning based detection of both calcified and soft (non-calcified) plaque using separately trained classifiers. The stenosis candidates can then be classified using probability scores obtained from the two classifiers.

Figure 10:
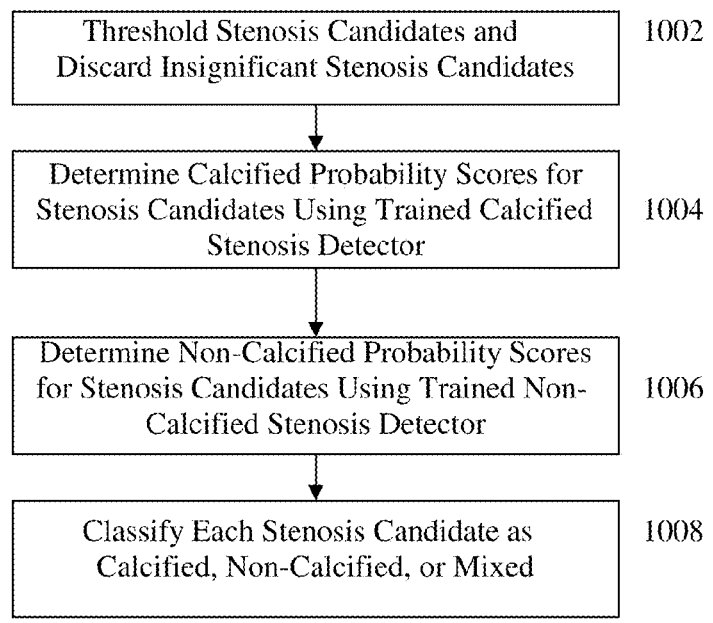
FIG. 10 illustrates a method of classifying stenosis candidates according to an embodiment of the present invention.

FIG. 10 illustrates a method of classifying stenosis candidates according to an embodiment of the present invention. The method of FIG. 10 can be used to implement step 112 of FIG. 1. At step 1002, the stenosis candidates are thresholded to determine significant and insignificant candidates, and the insignificant stenosis candidates are discarded. For this purpose, several features can be extracted for each stenosis candidate, such as the grade, the stenosis length, the left and right lumen radii, the minimum distance to the leaves, and the distance to the ostium. Thresholding one or more of these values can be used to identify stenosis candidates that can be considered significant and insignificant. For example, a threshold of 0.5 can be applied to the grade of the stenosis candidates, such that any stenosis candidate with a grade greater than 0.5 is considered acceptable and passes to step 1004 and any stenosis candidate with a grade less than 0.5 is considered insignificant and discarded.

At step 1004, calcified probability scores are calculated for each accepted stenosis candidate using a trained calcified stenosis detector. The trained calcified stenosis detector can be trained using the rotation invariant features and cylindrical sampling pattern described above and illustrated in FIG. 4. The trained calcified stenosis detector determines a calcified probability score for each point in a particular stenosis candidate. The calcified probability score for a point is a probability that the point is part of a calcified stenosis.

Figure 11:
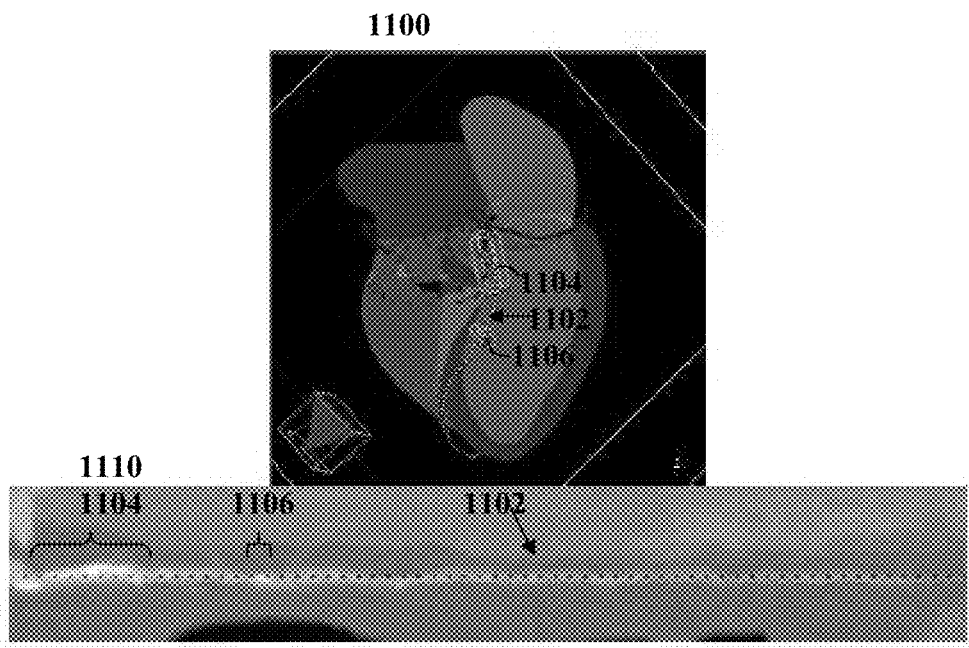
FIG. 11 illustrates an exemplary annotation scheme for annotating the centerlines and the calcified lesions.

In an exemplary implementation, the present inventors worked with scans obtained from 165 patients having a total of 355 calcified lesions to train the calcified stenosis detector. In all of the training volumes, the coronary centerlines and the calcified lesions were manually annotated for training and evaluation purposes. Most of the control points were not annotated exactly along the center of the lumen, however sufficient care was taken to make sure that almost all of the control points lie inside the outer walls of the coronary artery. This annotation scheme further makes the stenosis detection scheme described herein robust to inaccuracy of a given centerline. The three main coronary arteries (LAD, LCX, and RCA) can be analyzed in the training data for the presence of calcified lesions. The left main coronary artery (LM) can be annotated as part of the LAD artery. For the sake of consistency, the annotated centerlines can be re-sampled with a common resolution (e.g., 1 mm). FIG. 11 illustrates an exemplary annotation scheme for annotating the centerlines and the calcified lesions. As illustrated in FIG. 11, image 1100 shows the annotation of a centerline 1102 of the LAD coronary artery and calcified lesions 1104 and 1106 on the LAD coronary artery. Image 1110 is stretched CPR view of the same LAD coronary artery showing the annotation of the centerline 1102 and the calcified lesions 1104 and 1106.

In order to train the calcified stenosis detector, feature extraction can be performed around each control point using the cylindrical sampling pattern illustrated in FIG. 4. In particular, referring again to FIG. 4B, for a point at distance l, $-L/2 \leq l \leq L/2$, from a control point 412 along the axis of the cylinder 410, the following nine features can be extracted at a radius r, where $0 \leq r \leq R$: average, minimum, and maximum intensities ($I_{av}$, $I_{min}$, $I_{max}$), average, minimum, and maximum gradients along the radial direction ($G_{av}^r$, $G_{min}^r$, $G_{max}^r$), and average, minimum, and maximum gradients along the tangent direction ($G_{av}^t$, $G_{min}^t$, $G_{max}^t$). According to an advantageous implementation, a length of L=5 (times 0.5 mm) and a radius of R=3 (times 0.5 mm) can be used for extracting features for training the calcified stenosis detector. With L=5 and R=3, a 5×3×9=135 dimensional feature vector is obtained for each control point. According to an advantageous implementation, random forests based supervised learning can be used to automatically train the calcified stenosis detector based on the extracted features. Alternatively, a probabilistic boosting tree (PBT) can be used to train the calcified stenosis detector based on the extracted features.

Figure 12:
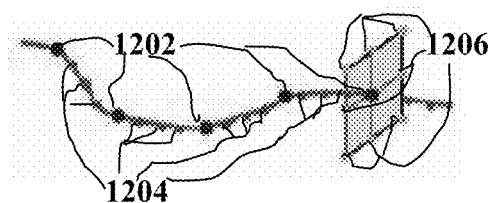
FIG. 12 illustrates the addition of positive training samples for training a calcified stenosis detector.

In an exemplary implementation, the present inventors divided the entire data set into four subsets for a 4-fold cross validation. Training was performed using random forests. To compensate for the large number of negative samples in comparison to the small number of positive samples, it is possible that every two consecutive positive control points be linearly interpolated with three additional points. Further, for every positive control point, eight neighboring points in the plane perpendicular to the centerline can also be added to the positive training samples. These two types of enhancements of the positive data help to avoid over-fitting and compensate for errors in centerline estimation. FIG. 12 illustrates the addition of positive training samples for training the calcified stenosis detector. As illustrated in FIG. 12, points 1202 represent the original positive control points, points 1204 represent the interpolated points, and points 1206 represent the neighboring points in the plane located normally to the centerline of the coronary.

Figure 13:
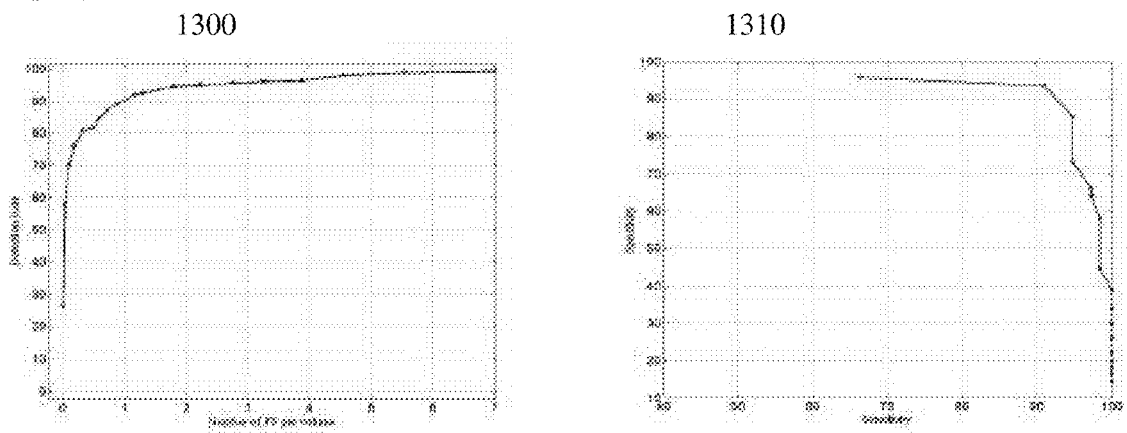
FIG. 13 illustrates ROC curves for a calcified stenosis detector.

For each coronary artery, testing was performed on the original set of control points. FIG. 13 illustrates ROC curves obtained for the calcified stenosis detector by varying the threshold on the output probabilities of the classifier. As illustrated in FIG. 13, graph 1300 is an ROC curve showing the number of false positive lesions vs. the percentage of correctly detected lesions. Graph 1310 is an ROC curve showing sensitivity vs. specificity on a per vessel basis. For lesion based evaluation, the true detection rate is defined as the percentage of actual lesions detected and the number of false positives per volume is the average number of lesions missed per volume. For vessel based evaluation, the sensitivity is defined as the percentage of vessels with lesions that are correctly detected, and the corresponding specificity is defined as the percentage of healthy vessels detected correctly as being healthy. In an exemplary implementation, an average detection time of 0.82 seconds per volume was achieved.

Figure 14:
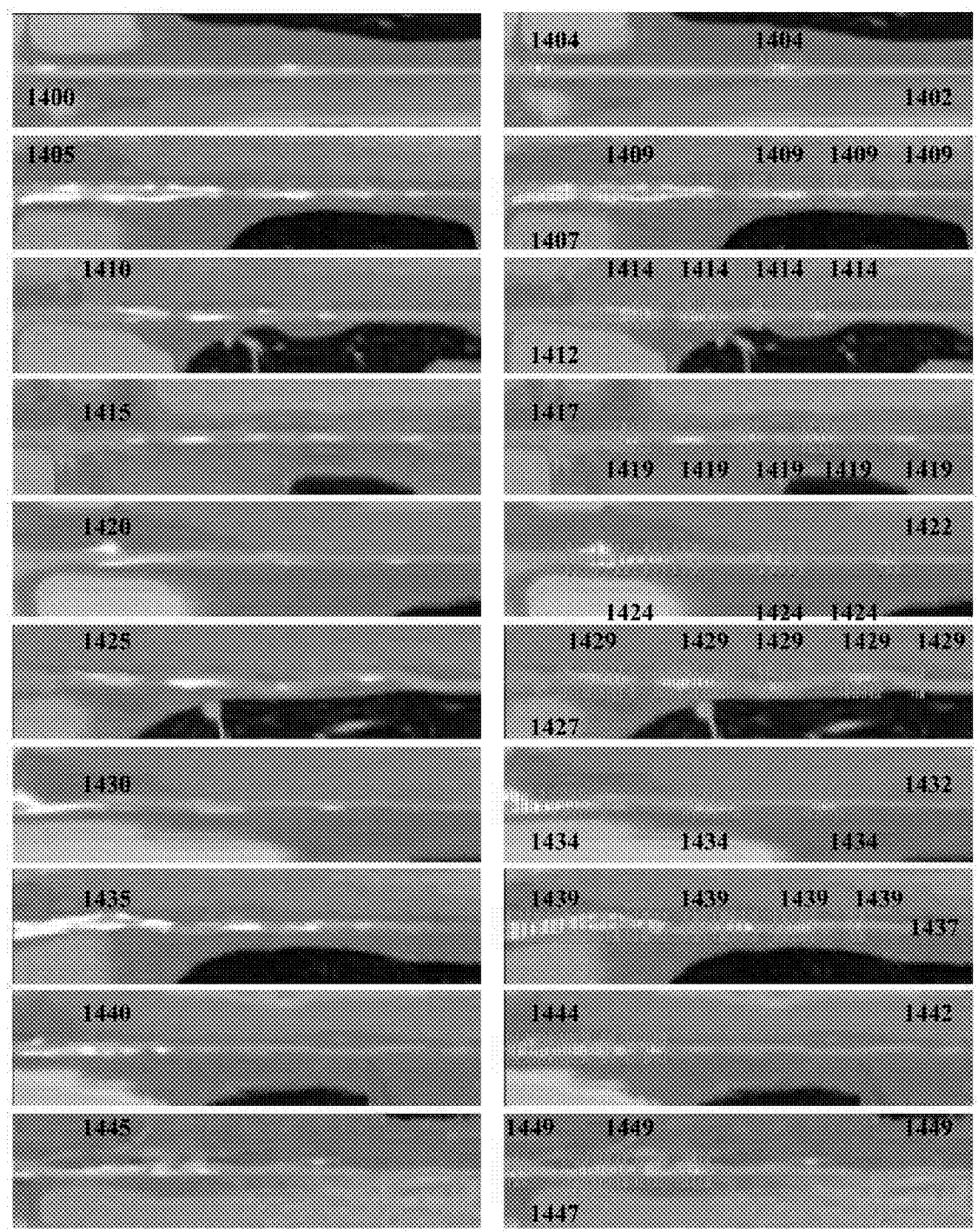
FIG. 14 illustrates exemplary calcified stenoses detection results using a trained calcified stenosis detector.

FIG. 14 illustrates exemplary calcified stenoses detection results using a trained calcified stenosis detector. As illustrated in FIG. 14, images 1400, 1405, 1410, 1415, 1420, 1425, 1430, 1435, 1440, and 1445 show input images and images 1402, 1407, 1412, 1417, 1422, 1427, 1432, 1437, 1442, and 1447 show calcified stenoses 1404, 1409 1414 1419 1424, 1429, 1434, 1439, 1444, and 1449 detected in the images 1400, 1405, 1410, 1415, 1420, 1425, 1430, 1435, 1440, and 1445, respectively.

Returning to FIG. 10, at step 1006, non-calcified probability scores are detected for the stenosis candidates using a trained non-calcified stenosis detector. The trained non-calcified stenosis detector determines a calcified probability score for each point in a particular stenosis candidate. The non-calcified probability score for a point is a probability that the point is part of a non-calcified stenosis. According to an advantageous implementation, a slightly different feature vector can be used for non-calcified stenosis detection, as compared with calcified stenosis detection. Instead of just computing the rotation invariant features around a control point, a sliding window approach can be used, and similar features from the adjacent left and right control points can also be appended to the feature vector.

At step 1008, each stenosis candidate is classified as "calcified", "non-calcified", or "mixed" based on the calcified probability scores and the non-calcified probability scores of points within each stenosis candidate. For example, each control point (or voxel) in a stenosis candidate can be classified as calcified or non-calcified based on a comparison of the calcified probability score and the non-calcified probability score for that point. The stenosis candidate can then be classified as calcified, non-calcified, or mixed based on the relative number of calcified points and non-calcified points in the stenosis candidate. A stenosis is classified as calcified if the stenosis is mainly caused by calcified components, classified as non-calcified if the stenosis is caused by non-calcified components, and mixed if the stenosis has calcified as well as non-calcified parts.

Returning to FIG. 1, at step 114, the stenosis detection and classification results are output. For example, the stenosis detection and classification results can be output by displaying the results on a display of computer system. The stenosis detection and classification results may also be output by storing the results, for example, in a memory or storage of a computer system, or in a computer readable medium.

In an exemplary implementation, the present inventors conducted experiments on data obtained from 225 patients to evaluate the performance of the detection system with respect to non-calcified stenoses. Table 2 shows the results of 10-fold cross validation experiments on a per lesion and a per vessel basis obtained by running the complete stenosis detection and classification methods of FIGS. 1 and 10.

TABLE 2

|        |               | LAD     | LCX    | RCA     | Overall |
|--------|---------------|---------|--------|---------|---------|
| Lesion | TPR           | 100.00% | 90.00% | 95.24%  | 94.55%  |
|        | FP/Per Volume | 0.81    | 1.03   | 1.13    | 2.97    |
| Vessel | Sensitivity   | 100.00% | 93.75% | 100.00% | 97.62%  |
|        | Specificity   | 75.23%  | 63.16% | 62.86%  | 67.14%  |
|        | Negative PV   | 100.00% | 99.17% | 100.00% | 99.77%  |

Figure 15:
FIGS. 15 and 16 illustrate exemplary stenosis detection and classification results obtained using the method of FIG. 1.
Figure 16:
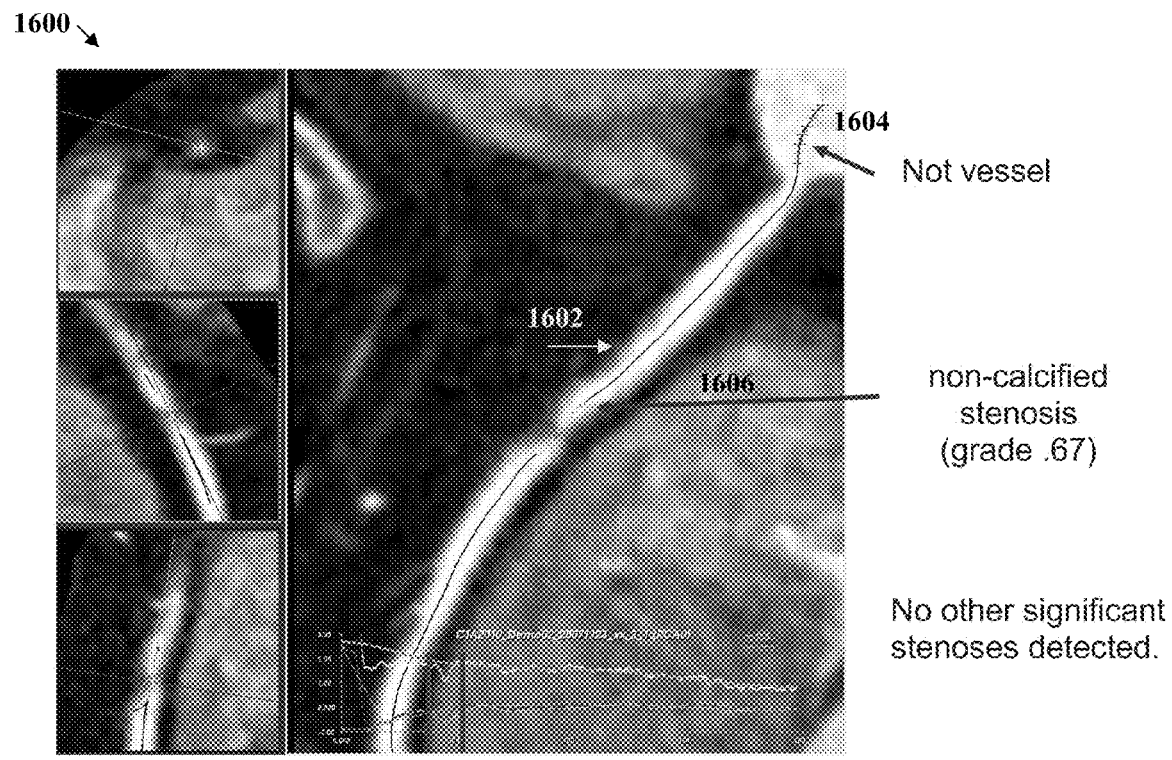

FIGS. 15 and 16 illustrate exemplary stenosis detection and classification results obtained using the method of FIG. 1. As illustrated in FIG. 15, image 1500 shows a centerline 1502 of a coronary artery, a non-vessel region 1504 detected on the centerline 1502, and a calcified stenosis 1506 detected in the coronary artery. The calcified stenosis has a grade of 0.68 and no other significant stenoses were detected. As illustrated in FIG. 16, image 1600 shows a centerline 1602 of a coronary artery, a non-vessel region 1604 detected on the centerline 1602, and a non-calcified stenosis 1606 detected in the coronary artery. The non-calcified stenosis has a grade of 0.67 and no other significant stenoses were detected.

As described above, FIG. 10 illustrates a process for classifying stenosis candidates. It is to be understood that the present invention is not limited to the method of FIG. 10. For example, alternatively, a multi-class classifier may be used to classify each stenosis candidate into one of the four classes of calcified, mixed, non-calcified, and discarded.

Figure 17:
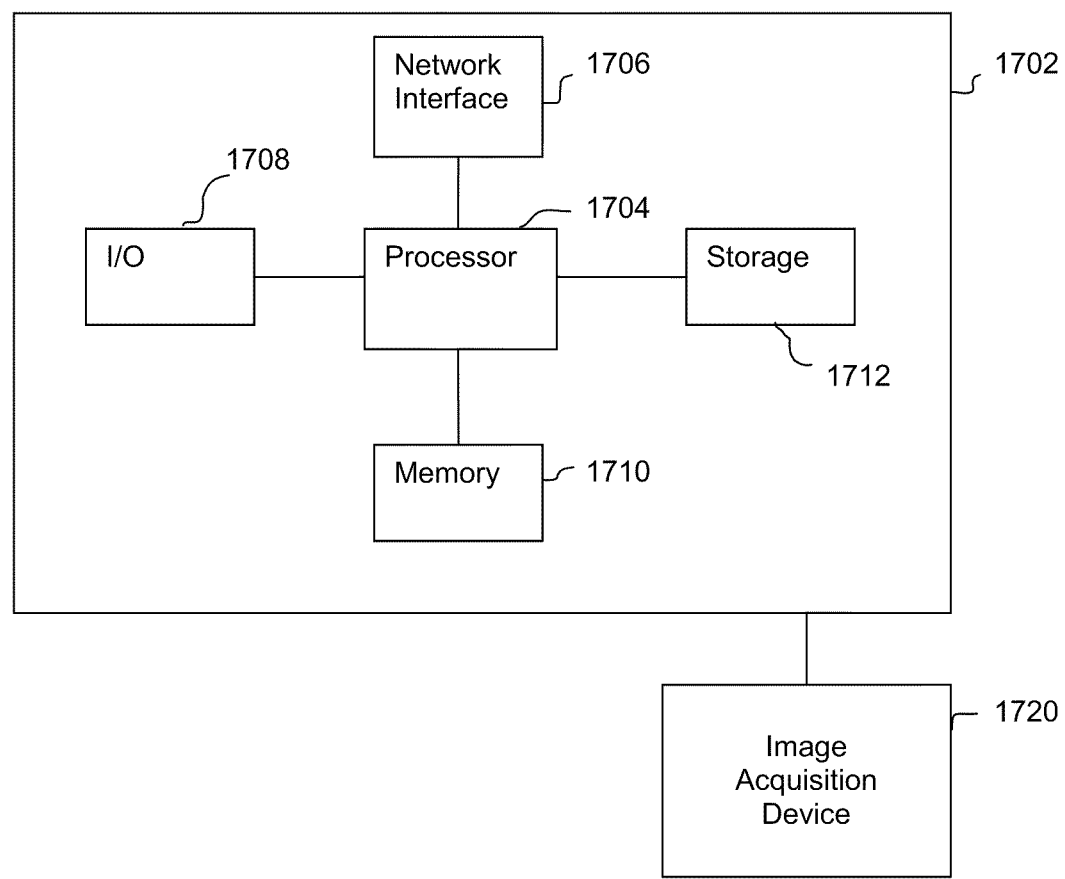
FIG. 17 is a high-level block diagram of a computer capable of implementing the present invention.

The above-described methods for detecting and classifying coronary stenoses may be implemented on a computer using well-known computer processors, memory units, storage devices, computer software, and other components. A high-level block diagram of such a computer is illustrated in FIG. 17. Computer 1702 contains a processor 1704, which controls the overall operation of the computer 1702 by executing computer program instructions which define such operation. The computer program instructions may be stored in a storage device 1712 (e.g., magnetic disk) and loaded into memory 1710 when execution of the computer program instructions is desired. Thus, the steps of the method of FIGS. 1 and 10 may be defined by the computer program instructions stored in the memory 1710 and/or storage 1712 and controlled by the processor 1704 executing the computer program instructions. An image acquisition device 1720, such as a CT scanning device, can be connected to the computer 1702 to input image data to the computer 1702. It is possible to implement the image acquisition device 1720 and the computer 1702 as one device. It is also possible that the image acquisition device 1720 and the computer 1702 communicate wirelessly through a network. The computer 1702 also includes one or more network interfaces 1706 for communicating with other devices via a network. The computer 1702 also includes other input/output devices 1708 that enable user interaction with the computer 1702 (e.g., display, keyboard, mouse, speakers, buttons, etc.). Such input/output devices 1708 may be used in conjunction with a set of computer programs as an annotation tool to annotate volumes received from the image acquisition device 1720. One skilled in the art will recognize that an implementation of an actual computer could contain other components as well, and that FIG. 17 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for detecting coronary stenoses in a 3D CT volume, comprising:
    extracting coronary vessel centerlines from the 3D CT volume;
    estimating a lumen cross-section area based on the extracted coronary vessel centerlines using a trained regression function; and
    detecting stenosis candidates based on the estimated lumen cross-section area,
    wherein the step of estimating a lumen cross-section area based on the extracted coronary vessel centerlines using a trained regression function comprises:
    estimating the lumen cross-section area at each of a plurality of points in the extracted coronary vessel centerlines using the trained regression function.

2. The method of claim 1, further comprising, prior to the step of estimating a lumen cross-section area based on the extracted coronary vessel centerlines:
    detecting non-vessel regions along the extracted coronary artery centerlines; and
    removing the detected non-vessel regions from the extracted coronary vessel centerlines.

3. The method of claim 2, wherein the step of detecting non-vessel regions along the extracted coronary artery centerlines comprises:

detecting the non-vessel regions using a trained non-vessel region detector based on rotation invariant features extracted at each of a plurality of points along the coronary vessel centerlines using a cylindrical sampling pattern.

4. The method of claim 3, wherein the trained non-vessel region detector is trained using random forests based on rotation invariant features extracted at each of a plurality of annotated training sample points using a cylindrical sampling pattern.

5. The method of claim 1, wherein the step of estimating the lumen cross-section area at each of a plurality of points in the extracted coronary vessel centerlines using the trained regression function comprises:

estimating the lumen cross-section area at each of the plurality of points based on rotation invariant features extracted the respective point using a cylindrical sampling pattern.

6. The method of claim 1, wherein the step of detecting stenosis candidates based on the estimated lumen cross-section area comprises:

generating a base-line curve using one of a low-pass filter and a spline smoother;
    generating a de-trended residual curve by subtracting the base-line curve from the estimated lumen cross-section area in a segment of the coronary vessel centerlines;
    extracting local maxima and local minima of the de-trended residual curve; and
    detecting a stenosis candidate in the segment of the coronary vessel based on the local maxima and local minima of the de-trended residual curve.

7. The method of claim 6, wherein the step of detecting stenosis candidates based on the estimated lumen cross-section area further comprises:

smoothing the de-trended residual curve prior to the step of extracting local maxima and local minima of the de-trended residual curve.

8. The method of claim 6, wherein the step of detecting stenosis candidates based on the estimated lumen cross-section area further comprises:

determining a grade for each detected stenosis candidate based on estimated lumen radius within the detected stenosis candidate.

9. The method of claim 1, further comprising:
automatically classifying the detected stenosis candidates.

10. The method of claim 9, wherein the step of classifying the detected stenosis candidates comprises:

comparing at least one feature of each detected stenosis candidate to a threshold to determine whether the stenosis candidate is significant;
    discarding all stenosis candidates determined not to be significant; and
    classifying each significant stenosis candidate as one of calcified, non-calcified, and mixed.

11. The method of claim 10, wherein the step of comparing at least one feature of each detected stenosis candidate to a threshold to determine whether the stenosis candidate is significant comprises:

comparing a grade calculated for each stenosis candidate to a threshold;
    if the grade for a stenosis candidate is greater than the threshold, the stenosis candidate is determined to be significant;
    if the grade for a stenosis candidate is not greater than the threshold, the stenosis candidate is determined not to be significant.

12. The method of claim 10, wherein the step of classifying each significant stenosis candidate as one of calcified, non-calcified, and mixed comprises:

determining a calcified probability score for each of a plurality of points in a significant stenosis candidate using a trained calcified stenosis detector;
    determining a non-calcified probability score for each of the plurality of points in the significant stenosis candidate using a trained non-calcified stenosis detector; and
    classifying the significant stenosis candidate as one of calcified, non-calcified, and mixed based on the calcified-probability scores and the non-calcified probability scores of the plurality of points in the significant stenosis candidate.

13. The method of claim 12, wherein the step of classifying the significant stenosis candidate based on the calcified-probability scores and the non-calcified probability scores of the plurality of points in the significant stenosis candidate comprises:

classifying each of the plurality of points in the significant stenosis candidate as one of calcified and non-calcified based on the calcified probability score and the non-calcified probability score for the respective point; and
    classifying the significant stenosis candidate as one of calcified, non-calcified, and mixed based on the relative number of the plurality of points classified as calcified and non-calcified in the significant stenosis candidate.

14. The method of claim 1, wherein the 3D CT image volume is a computed tomography angiograph (CCTA) image volume.

15. An apparatus for detecting coronary stenoses in a 3D CT volume, comprising:

means for extracting coronary vessel centerlines from the 3D CT volume;
    means for estimating a lumen cross-section area based on the extracted coronary vessel centerlines using a trained regression function; and
    means for detecting stenosis candidates based on the estimated lumen cross-section area,
    wherein the means for estimating a lumen cross-section area based on the extracted coronary vessel centerlines using a trained regression function comprises:
    means for estimating the lumen cross-section area at each of a plurality of points in the extracted coronary vessel centerlines using the trained regression function.

16. The apparatus of claim 15, further comprising:

means for detecting non-vessel regions along the extracted coronary artery centerlines; and
    means for removing the detected non-vessel regions from the extracted coronary vessel centerlines.

17. The apparatus of claim 16, wherein the means for detecting non-vessel regions along the extracted coronary artery centerlines comprises:

means for detecting the non-vessel regions using a trained non-vessel region detector based on rotation invariant features extracted at each of a plurality of points along the coronary vessel centerlines using a cylindrical sampling pattern.

18. The apparatus of claim 15, wherein the means for detecting stenosis candidates based on the estimated lumen cross-section area comprises:

means for generating a base-line curve using one of a low-pass filter and a spline smoother;

means for generating a de-trended residual curve by subtracting the base-line curve from the estimated lumen cross-section area in a segment of the coronary vessel centerlines;

means for extracting local maxima and local minima of the de-trended residual curve; and means for detecting a stenosis candidate in the segment of the coronary vessel based on the local maxima and local minima of the de-trended residual curve.

19. The apparatus of claim 15, further comprising:
means for automatically classifying the detected stenosis candidates.

20. The apparatus of claim 19, wherein the means for classifying the detected stenosis candidates comprises:
means for comparing at least one feature of each detected stenosis candidate to a threshold to determine whether the stenosis candidate is significant;
means for discarding all stenosis candidates determined not to be significant; and
means for classifying each significant stenosis candidate as one of calcified, non-calcified, and mixed.

21. The apparatus of claim 20, wherein the means for classifying each significant stenosis candidate as one of calcified, non-calcified, and mixed comprises:
means for determining a calcified probability score for each of a plurality of points in a significant stenosis candidate using a trained calcified stenosis detector;
means for determining a non-calcified probability score for each of the plurality of points in the significant stenosis candidate using a trained non-calcified stenosis detector; and
means for classifying the significant stenosis candidate as one of calcified, non-calcified, and mixed based on the calcified-probability scores and the non-calcified probability scores of the plurality of points in the significant stenosis candidate.

22. A non-transitory computer readable medium encoded with computer executable instructions for detecting coronary stenoses in a 3D CT volume, the computer executable instructions defining steps comprising:
extracting coronary vessel centerlines from the 3D CT volume;
estimating a lumen cross-section area based on the extracted coronary vessel centerlines using a trained regression function; and
detecting stenosis candidates based on the estimated lumen cross-section area,
wherein the computer executable instructions defining the step of estimating a lumen cross-section area based on the extracted coronary vessel centerlines using a trained regression function comprise computer executable instructions defining the step of:
estimating the lumen cross-section area at each of a plurality of points in the extracted coronary vessel centerlines using the trained regression function.

23. The computer readable medium of claim 22, further comprising computer executable instructions defining the steps of:
detecting non-vessel regions along the extracted coronary artery centerlines; and
removing the detected non-vessel regions from the extracted coronary vessel centerlines.

24. The computer readable medium of claim 23, wherein the computer executable instructions defining the step of detecting non-vessel regions along the extracted coronary artery centerlines comprise computer executable instructions defining the step of:
detecting the non-vessel regions using a trained non-vessel region detector based on rotation invariant features extracted at each of a plurality of points along the coronary vessel centerlines using a cylindrical sampling pattern.

25. The computer readable medium of claim 22, wherein the computer executable instructions defining the step of detecting stenosis candidates based on the estimated lumen cross-section area comprise computer executable instructions defining the steps of:
generating a base-line curve using one of a low-pass filter and a spline smoother;
generating a de-trended residual curve by subtracting the base-line curve from the estimated lumen cross-section area in a segment of the coronary vessel centerlines;
extracting local maxima and local minima of the de-trended residual curve; and
detecting a stenosis candidate in the segment of the coronary vessel based on the local maxima and local minima of the de-trended residual curve.

26. The computer readable medium of claim 22, further comprising computer executable instructions defining the step of:
automatically classifying the detected stenosis candidates.

27. The computer readable medium of claim 26, wherein the computer executable instructions defining the step of classifying the detected stenosis candidates comprise computer executable instructions defining the steps of:
comparing at least one feature of each detected stenosis candidate to a threshold to determine whether the stenosis candidate is significant;
discarding all stenosis candidates determined not to be significant; and
classifying each significant stenosis candidate as one of calcified, non-calcified, and mixed.

28. The computer readable medium of claim 27, wherein the computer executable instructions defining the step of classifying each significant stenosis candidate as one of calcified, non-calcified, and mixed comprise computer executable instructions defining the steps of:
determining a calcified probability score for each of a plurality of points in a significant stenosis candidate using a trained calcified stenosis detector;
determining a non-calcified probability score for each of the plurality of points in the significant stenosis candidate using a trained non-calcified stenosis detector; and
classifying the significant stenosis candidate as one of calcified, non-calcified, and mixed based on the calcified-probability scores and the non-calcified probability scores of the plurality of points in the significant stenosis candidate.

* * * * *